(12) United States Patent
Nab, Jr. et al.

(10) Patent No.: US 10,308,277 B2
(45) Date of Patent: Jun. 4, 2019

(54) SPHERICAL WASHER ASSEMBLY

(71) Applicant: Steering Solutions IP Holding Corporation, Saginaw, MI (US)

(72) Inventors: Edwin J. Nab, Jr., Saginaw, MI (US); Richard L. Deitering, Flushing, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 682 days.

(21) Appl. No.: 14/805,850

(22) Filed: Jul. 22, 2015

(65) Prior Publication Data

US 2017/0021856 A1 Jan. 26, 2017

(51) Int. Cl.
*B62D 5/04* (2006.01)
*B62D 3/12* (2006.01)
*F16B 43/00* (2006.01)
*B62D 1/16* (2006.01)

(52) U.S. Cl.
CPC ............... *B62D 5/04* (2013.01); *B62D 1/16* (2013.01); *B62D 3/12* (2013.01); *F16B 43/00* (2013.01)

(58) Field of Classification Search
CPC .... B62D 5/04; B62D 1/16; B62D 3/12; F16B 43/00
USPC .......... 180/443, 444, 446; 74/491, 492, 495; 280/777, 779, 780
See application file for complete search history.

(56) References Cited

U.S. PATENT DOCUMENTS

| | | | | |
|---|---|---|---|---|
| 7,913,802 B2* | 3/2011 | Wilkes | ................. | B62D 5/0409 180/443 |
| 8,550,205 B2* | 10/2013 | Kuroumaru | .......... | B62D 5/0406 180/443 |
| 8,667,858 B2* | 3/2014 | Fuechsel | ............. | B62D 5/0409 384/535 |
| 8,746,740 B2* | 6/2014 | Tanaka | .................. | B62D 1/184 280/771 |
| 9,599,165 B2* | 3/2017 | Lu | ........................... | F16C 27/04 |
| 2004/0182188 A1* | 9/2004 | Nakamura | ........... | B62D 5/0409 74/409 |
| 2006/0278466 A1* | 12/2006 | Cheng | ..................... | B62D 5/04 180/444 |
| 2007/0169985 A1* | 7/2007 | Peringat | .................. | B62D 5/22 180/427 |
| 2007/0193819 A1* | 8/2007 | Iwasa | .................. | B62D 5/0409 180/444 |

(Continued)

FOREIGN PATENT DOCUMENTS

JP 2009074623 A * 4/2009

*Primary Examiner* — Jacob D Knutson
(74) *Attorney, Agent, or Firm* — Cantor Colburn LLP

(57) ABSTRACT

According to one exemplary embodiment of the present invention a steering mounting assembly to couple a rack and pinion steering mechanism to a vehicle is provided. The steering mounting assembly includes a first spherical washer to interface with the rack and pinion steering mechanism. The steering mounting assembly further includes a second spherical washer to interface with the vehicle and the first spherical washer. The first spherical washer and the second spherical washer form a relative angle between the rack and pinion steering mechanism and the vehicle. The steering mounting assembly further includes a ring retainer to retain the first spherical washer and the second spherical washer.

14 Claims, 5 Drawing Sheets

(56) References Cited

U.S. PATENT DOCUMENTS

| | | | |
|---|---|---|---|
| 2009/0071562 A1* | 3/2009 | Gunderson | F16L 37/0987 138/96 R |
| 2009/0250894 A1* | 10/2009 | Kojima | B62D 3/12 280/93.515 |
| 2013/0048412 A1* | 2/2013 | Kuroumaru | B62D 5/0406 180/446 |
| 2015/0274198 A1* | 10/2015 | Sato | B62D 3/12 180/444 |
| 2017/0001660 A1* | 1/2017 | Chiba | B62D 5/0472 |

* cited by examiner
SPHERICAL WASHER ASSEMBLY

FIELD OF THE INVENTION

The subject invention relates to a spherical washer assembly and more particularly a spherical washer assembly suitable for use in electric power steering systems.

BACKGROUND

In an Electric Power Steering (EPS) unit an electric motor drives a worm shaft and a worm gear to provide assist torque to the turning of a steering shaft. This reduces the effort required to steer a vehicle. In certain applications, the mounting interface between the EPS housing and the vehicle can affect the responsiveness and feel of the steering system. In certain applications, vehicle configuration can prevent a flush mounting interface between the vehicle and the EPS housing.

Accordingly, it is desirable to provide a spherical washer assembly to mount an EPS housing to the vehicle without the prior disadvantages.

SUMMARY OF THE INVENTION

According to one exemplary embodiment of the present invention a steering mounting assembly to couple a rack and pinion steering mechanism to a vehicle is provided. The steering mounting assembly includes a first spherical washer to interface with the rack and pinion steering mechanism. The steering mounting assembly further includes a second spherical washer to interface with the vehicle and the first spherical washer. The first spherical washer and the second spherical washer form a relative angle between the rack and pinion steering mechanism and the vehicle. The steering mounting assembly further includes a ring retainer to retain the first spherical washer and the second spherical washer.

In another exemplary embodiment of the present invention a method to couple a rack and pinion steering mechanism to a vehicle is provided. The method includes interfacing an first spherical washer with the rack and pinion steering mechanism. The method further includes interfacing a second spherical washer with the vehicle. The method further includes interfacing the second spherical washer with the first spherical washer. The method further includes forming a relative angle between the rack and pinion steering mechanism and the vehicle via the first spherical washer and the second spherical washer. The method further includes retaining the first spherical washer and the second spherical washer together via a ring retainer.

In yet another exemplary embodiment of the present invention, an electric power steering system is provided. The electric power steering system comprises a steering shaft connected to handwheel at one end and a rack and pinion steering mechanism at an opposite end. A steering assist unit comprising an electric motor operated by a controller and driving a worm shaft is provided. A steering mounting assembly to couple the rack and pinion steering mechanism to a vehicle is provided. The steering mounting assembly includes a first spherical washer to interface with the rack and pinion steering mechanism. The steering mounting assembly further includes a second spherical washer to interface with the vehicle and the first spherical washer. The first spherical washer and the second spherical washer form a relative angle. The steering mounting assembly further includes a ring retainer to retain the first spherical washer and the second spherical washer.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DESCRIPTION OF THE EMBODIMENTS

Figure 1:
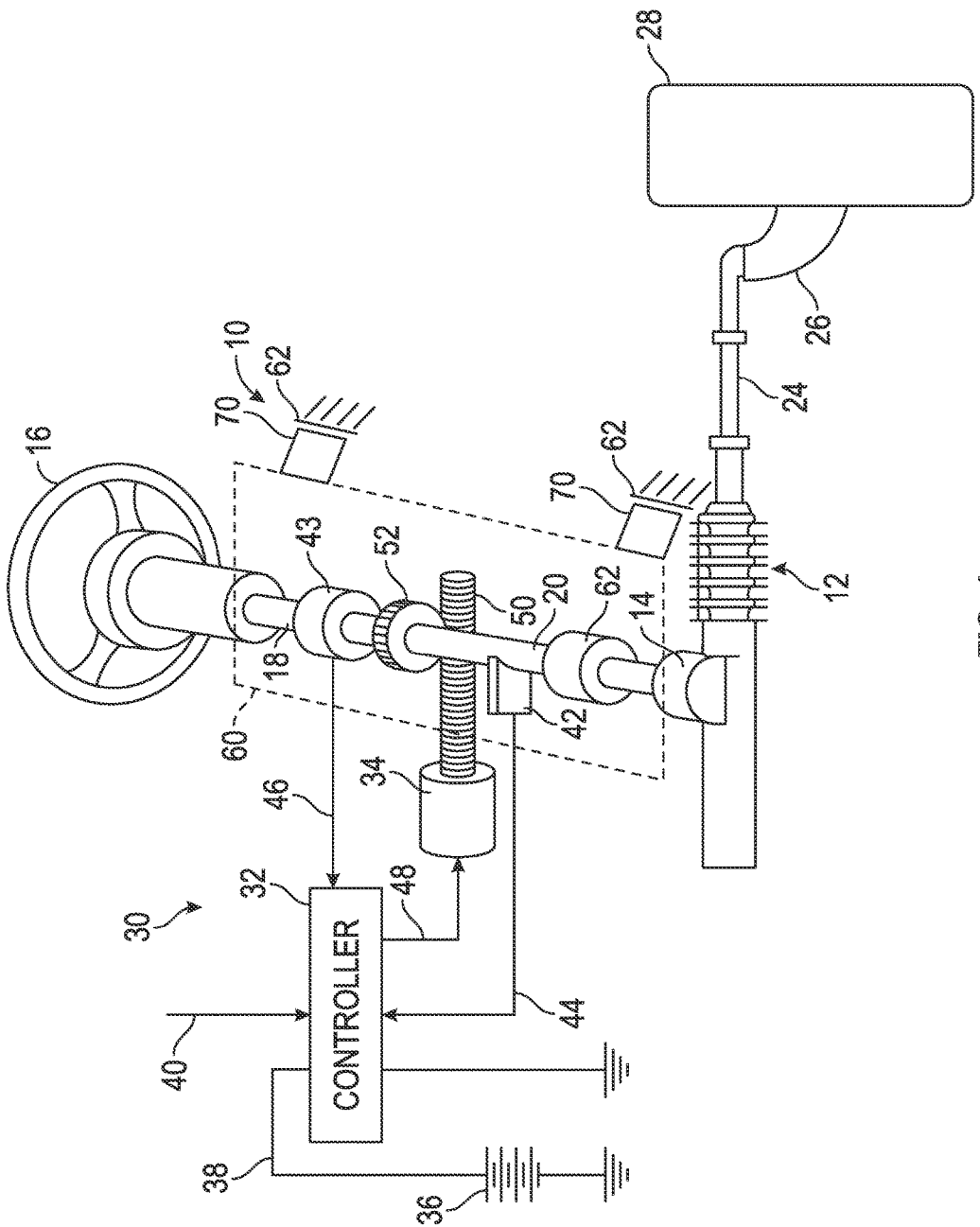
FIG. 1 is a schematic diagram of a power steering system in accordance with the invention.

Referring now to the Figures, where the invention will be described with reference to specific embodiments without limiting same, and in accordance with exemplary embodiments of the present invention, FIG. 1 shows an electric power steering (EPS) system 10 for a motor vehicle. The EPS system 10 includes a rack-and-pinion type steering mechanism 12 that is comprised of a toothed rack (not shown) and a pinion gear (not shown) located under a gear housing 14. A steering wheel 16 is coupled to an upper steering shaft 18. As the steering wheel 16 is turned, the upper steering shaft 18, which is connected to a lower steering shaft 20 and a universal joint 22, turns the pinion gear. Rotation of the pinion gear moves the toothed rack, which moves tie rods 24 (only one shown) that, in turn, move steering knuckles 26 (only one shown), which turn wheels 28 (only one shown).

EPS assist torque is provided through a steering assist unit 30, which includes a controller 32 and an electric motor 34. The controller 32 is powered by a vehicle power supply 36 through a supply line 38. The controller 32 receives a signal indicative of the vehicle velocity on a signal line 40. Steering pinion gear angle is measured by a position sensor 42 and fed to the controller 32 through a line 44. As the steering wheel 16 is turned, a torque sensor 43 senses the torque applied to the steering wheel 16 by a vehicle operator. The torque sensor 43 may include a torsion bar (not shown) and a variable-resistance type of sensor (not shown) that outputs a variable resistance signal to the controller 32 through a line 46 in relation to the amount of twist on the torsion bar.

In response to the inputs on lines 40, 44 and 46, the controller 32 sends a command signal through a line 48 to the electric motor 34. The motor 34, in turn, supplies an assist torque to the steering system 10 through a worm shaft 50 and a worm gear 52, in order to provide a steering torque assist to the steering system 10 that supplements the steering force exerted by a vehicle operator. In an exemplary embodiment, components of the steering system 10 are disposed within an EPS housing 60.

In an exemplary embodiment, the EPS housing 60 of the steering system 10 is coupled to the vehicle 62 via a spherical washer assembly 70. Advantageously, the spherical washer assembly 70 allows for secure and flush mounting of the EPS housing 60 to the vehicle 62, even when a relative angle exists between the EPS housing 60 and the vehicle 62. Accordingly, the spherical washer assembly 70 allows for desirable steering feel and proper steering operation by reducing alignment sensitivity between the EPS housing 60 and the vehicle 62. In certain embodiments, the EPS housing 60 includes features to receive the spherical washer assembly 70 to ensure a proper interface. In certain embodiments, the vehicle 62 also includes features to receive the spherical washer assembly 70 to ensure a proper interface. In certain embodiments, the vehicle 62 can include portions of the vehicle frame, body, etc.

Figure 2:
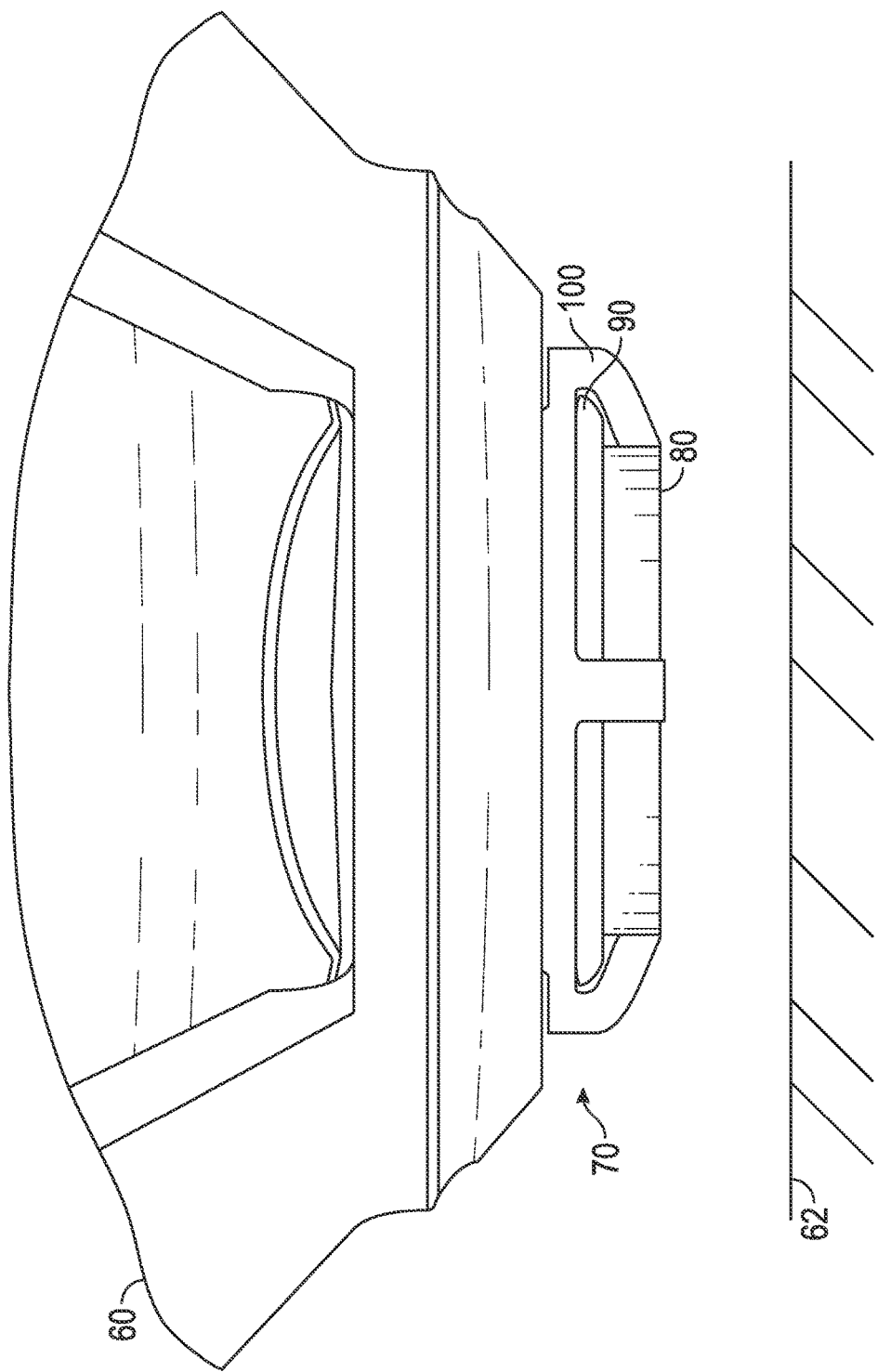
FIG. 2 is a pictorial view of a spherical washer assembly suitable for use with a power steering system, such as the power steering system shown in FIG. 1.
Figure 3:
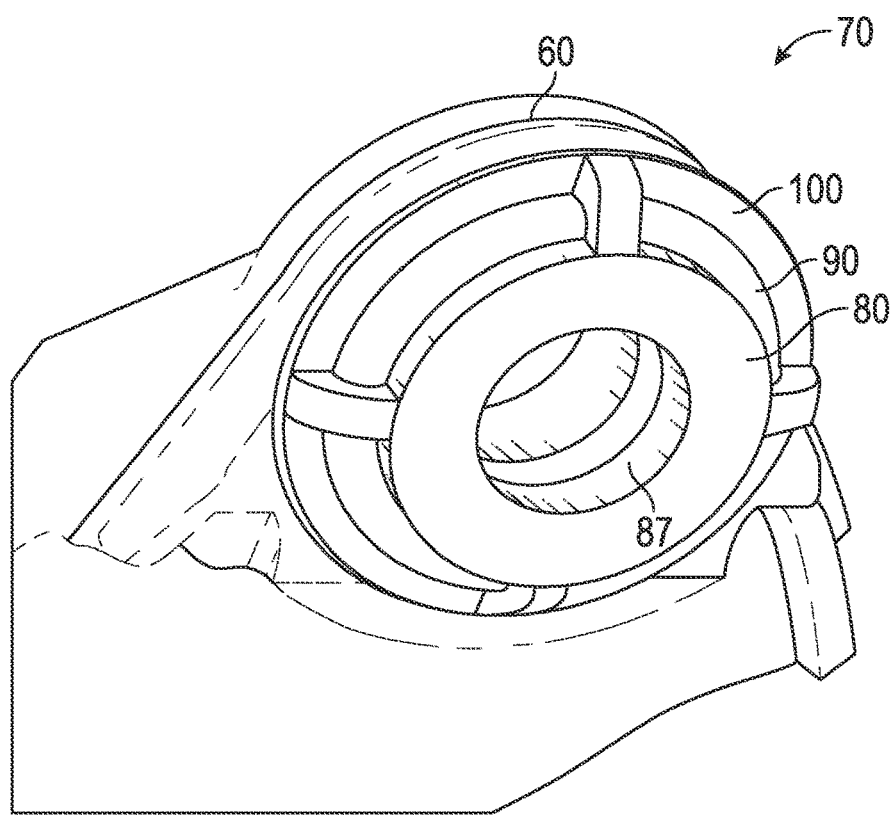
FIG. 3 is another pictorial view of a spherical washer assembly.

Referring to FIGS. 2 and 3, a spherical washer assembly 70 is shown. In an exemplary embodiment, the spherical washer assembly 70 includes a first or lower spherical washer 80, a second or upper spherical washer 90, and a retainer 100. Advantageously, the spherical washer assembly 70 can adapt angular differences between the EPS housing 60 and the vehicle 62 mounting surfaces. Particularly, the lower spherical washer 80 and the upper spherical washer 90 can be designed to meet various differences in relative angles between the EPS housing 60 and the vehicle 62 mounting point as configured.

In an exemplary embodiment, as assembled, the spherical washer assembly 70 can provide a flush mounting surface to the EPS housing 60 via the upper spherical washer 90 and provide a flush mounting surface to the vehicle 62 mounting surface via the lower spherical washer 80. However, there is an angle between the upper spherical washer 90 and the lower spherical washer 80.

Figure 4:
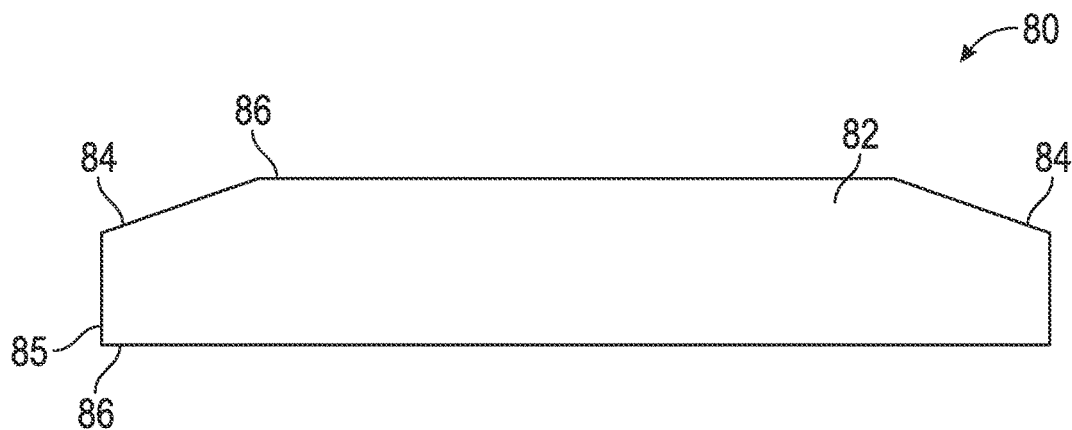
FIG. 4 is a pictorial view of a lower spherical washer of the spherical washer assembly shown in FIGS. 2 and 3.

Referring to FIG. 4, the lower spherical washer 80 is shown. In an exemplary embodiment, the lower spherical washer 80 includes a body 82, a spherical bevel 84, an edge 85, an upper face 86, a through hole 87, and a lower face 88. In certain embodiments, the lower spherical washer 80 can be retained during shipping or otherwise before installation via a retainer 100.

In certain embodiments, the body 82 is formed from a metallic material. In other embodiments, the body 82 is formed of any suitable material.

In an exemplary embodiment, a spherical bevel 84 is located on an upper face 86 of the lower spherical washer 80. When assembled, the spherical bevel 84 can interface with the upper spherical washer 90 to allow a relative angle therebetween while allowing the lower face 88 to remain flush to the vehicle 62. In certain embodiments, the angle and radius of the spherical bevel 84 can be configured to provide an adequate adjustment range to reflect the intended mounting configuration between the EPS housing 60 and the vehicle 62. In an exemplary embodiment, a through hole 87 (shown in FIG. 3) allows for a suitable bolt to pass therethrough.

In an exemplary embodiment, the lower face 88 is a flat face configured to interface with the vehicle 62. The lower face 88 can interface with a vehicle 62 frame to provide a solid mounting attachment, while allowing for a relative angle between the vehicle 62 and the EPS housing 60. In certain embodiments, the lower face 88 can include features to engage with a feature or receiver of the vehicle 62.

Figure 5A:
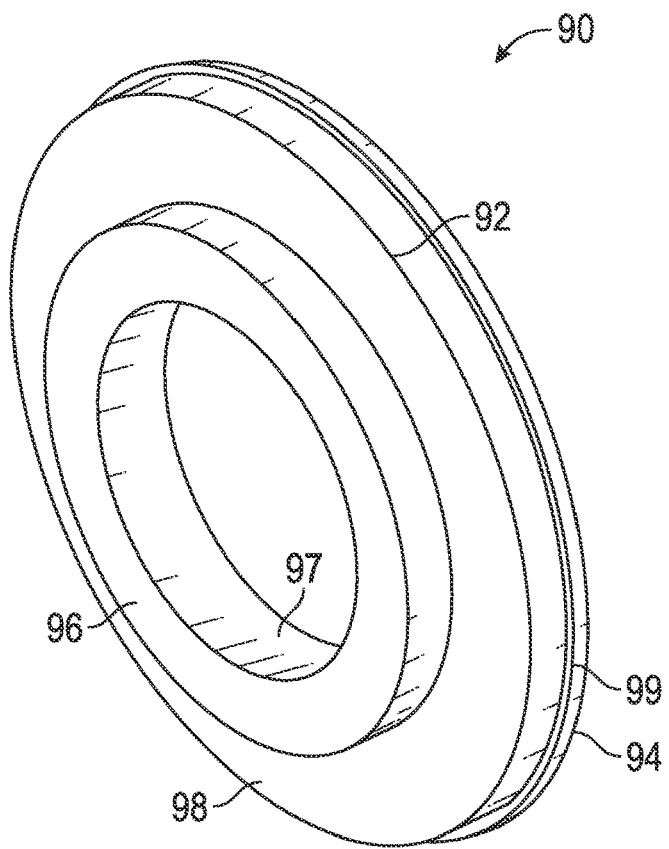
FIG. 5A is a pictorial view of a upper spherical washer of the spherical washer assembly shown in FIGS. 2 and 3.
Figure 5B:
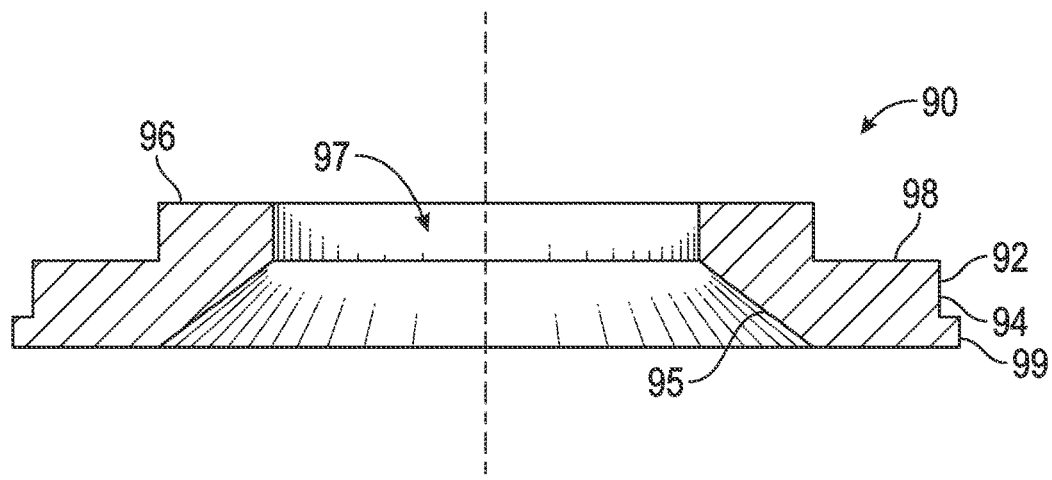
FIG. 5B is a cross sectional view of the upper spherical washer of FIG. 5A.

Referring to FIGS. 5A and 5B, an upper spherical washer 90 is shown. In an exemplary embodiment, the upper spherical washer includes a body 92, an edge 94, a spherical bevel 95, a collar 96, a through hole 97, a lower face 98, and a retaining edge 99. The spherical bevel 95 of the upper spherical washer 90 interfaces with the spherical bevel 84 of the lower spherical washer 80 to allow a relative angle therebetween, while allowing a desirable interface with the EPS housing 60.

In an exemplary embodiment, the body 92 is formed from a metallic material. In other embodiments, the body 92 can be formed from any other suitable material.

In an exemplary embodiment, the edge 94 and the retaining edge 99 provide a mounting surface for the retainer 100 to mount. In certain embodiments, the retaining edge 99 is sized to allow the retainer 100 to snap on and engage with the edge 94 and the retaining edge 99. The retaining edge 99 may have a diameter slightly larger than that of the edge 94.

In an exemplary embodiment, the upper spherical washer 90 interfaces with the EPS housing 60 via the collar 96 and the lower face 98. The collar 96 can be received by the EPS housing 60 in a receiving feature. Advantageously, such a receiving feature in conjunction with the collar 96 allows for rapid location of the upper spherical washer 90 during assembly. In certain embodiments, the upper spherical washer 90 is pressed into the EPS housing 60. In an exemplary embodiment, the collar 96 and the lower face 98 interface with the EPS housing 60 to provide a flush mount.

In an exemplary embodiment, a spherical bevel 95 is located on a lower inner portion of the upper spherical washer 90. When assembled, the spherical bevel 95 can interface with the lower spherical washer 80 via the spherical bevel 84 to allow a relative angle therebetween while allowing the collar 96 and the lower face 98 to remain flush to the EPS housing 60. In certain embodiments, the angle and radius of the spherical bevel 95 can be configured to provide an adequate adjustment range to reflect the intended mounting configuration between the EPS housing 60 and the vehicle 62. In an exemplary embodiment, upper spherical washer 90 includes a through hole 97 to allow for a suitable bolt to pass therethrough.

Figure 6:
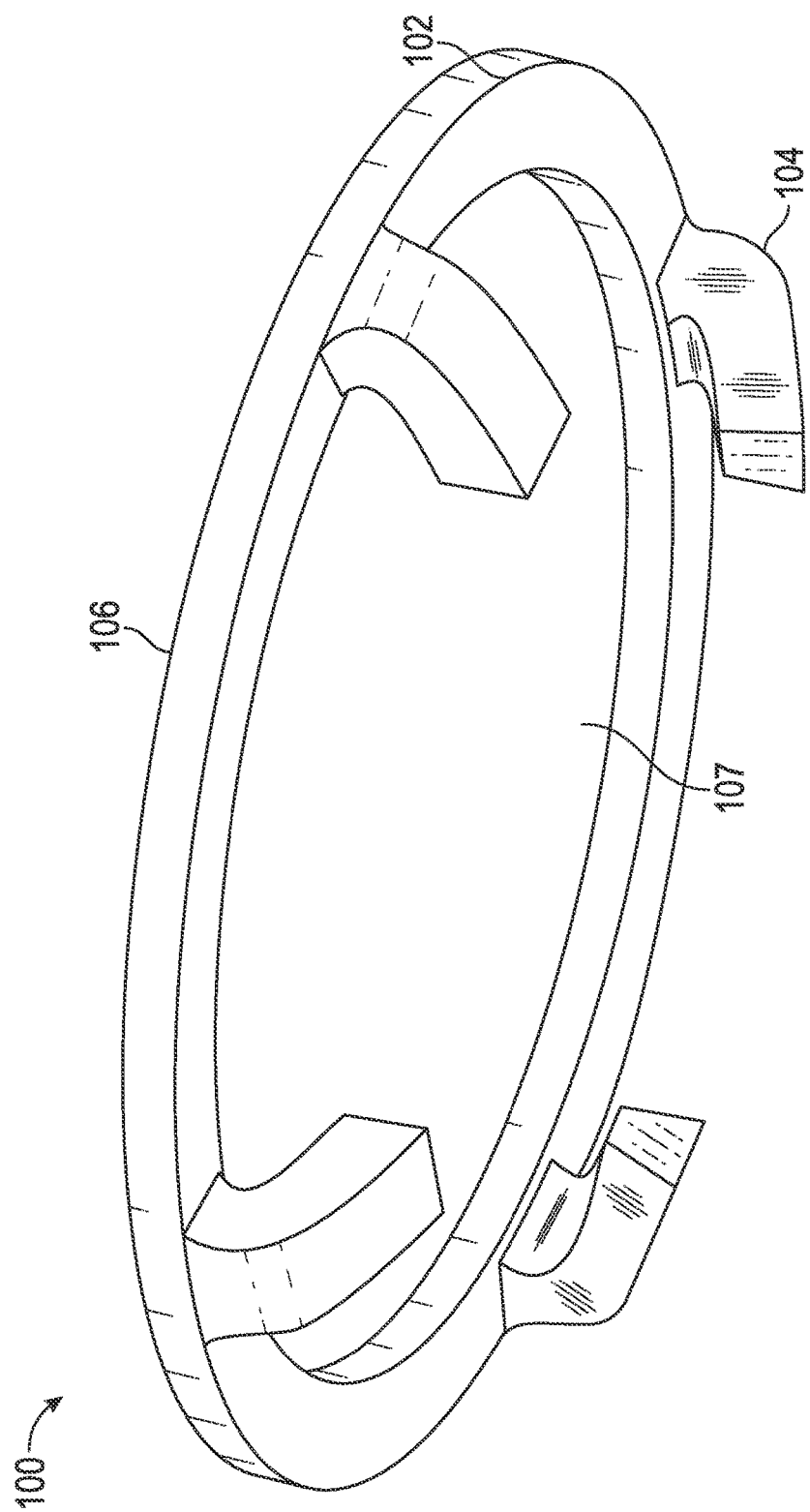
FIG. 6 is a pictorial view of a retainer of the spherical washer assembly shown in FIGS. 2 and 3.

Referring to FIG. 6, a retainer 100 is shown. In an exemplary embodiment, the retainer 100 includes a body 102, retainer arms 104, a ring portion 106, and a through hole 107. Advantageously, the retainer 100 allows the upper spherical washer 90 and the lower spherical washer 80 to be shipped and installed as an assembly, facilitating ease of installation and lower total costs. The retainer 100 does not need to be removed and allows for a relative angle to be disposed between the upper spherical washer 90 and the lower spherical washer 80.

In an exemplary embodiment, the body 102 is formed from a polymeric material. In alternative embodiments, the body 102 is formed from any suitable material.

In an exemplary embodiment, retainer arms 104 interface with the lower spherical washer 80 to retain the lower spherical washer 80 during shipping and installation. In an exemplary embodiment, the ring portion 106 interfaces with the retaining edge 99 of the upper spherical washer 90 to hold the spherical washer assembly 70 together.

In an exemplary embodiment, the retainer 100 includes a through hole 107 to allow movement of the upper spherical washer 90 and the lower spherical washer 80.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

The invention claimed is:

1. A steering mounting assembly to couple a rack and pinion steering mechanism to a vehicle, the steering mounting assembly comprising:
   a first spherical washer to interface with the rack and pinion steering mechanism, the first spherical washer including a spherical bevel;
   a second spherical washer to interface with the vehicle, the second spherical washer including a spherical bevel in direct operative contact with the spherical bevel of the first spherical washer, the first spherical washer and the second spherical washer forms a relative angle between the rack and pinion steering mechanism and the vehicle; and
   a ring retainer to retain the first spherical washer and the second spherical washer.

2. The steering mounting assembly of claim 1, wherein the relative angle is adjustable.

3. The steering mounting assembly of claim 1, wherein the ring retainer is formed of a polymeric material.

4. The steering mounting assembly of claim 1, wherein the first spherical washer is pressed into the rack and pinion steering mechanism.

5. The steering mounting assembly of claim 1, wherein the first spherical washer has a retaining lip to engage with the ring retainer.

6. The steering mounting assembly of claim 1, wherein the first spherical washer includes a collar to engage the rack and pinion steering mechanism.

7. An electric power steering system comprising:
   a steering shaft connected to a handwheel at one end and a rack and pinion steering mechanism at an opposite end;
   a steering assist unit comprising an electric motor operated by a controller and driving a worm shaft and a worm gear interposed between said worm shaft and said steering shaft; and
   a steering mounting assembly to couple the rack and pinion steering mechanism to a vehicle, the steering mounting assembly comprising:
      a first spherical washer to interface with the rack and pinion steering mechanism, the first spherical washer including a spherical bevel;
      a second spherical washer to interface with the vehicle, the second spherical washer including a spherical bevel in direct operative contact with the spherical bevel of the first spherical washer, the first spherical washer and the second spherical washer forms a relative angle between the rack and pinion steering mechanism and the vehicle; and
      a ring retainer to retain the first spherical washer and the second spherical washer.

8. An electric power steering system for a vehicle comprising:
   a steering assist unit including a housing; and
   a washer assembly including a first spherical washer adapted to interface with the housing, and a second spherical washer adapted to interface between the first spherical washer and the vehicle, the first and second spherical washers adapted to adjust and conform to a relative angle between the housing and the vehicle.

9. The electric power steering system set forth in claim 8, wherein the first spherical washer is in fixed engagement with the housing, and the second washer is in fixed engagement with the vehicle.

10. The electric power steering system set forth in claim 9, wherein the first and second washers each include a spherical bevel in direct and adjustable contact with one-another.

11. The electric power steering system set forth in claim 8, wherein the washer assembly includes a ring retainer adapted to retain the first spherical washer and the second spherical washer.

12. The electric power steering system set forth in claim 11, wherein the first spherical washer has a retaining lip adapted to engage the ring retainer and a collar adapted to engage the housing.

13. The electric power steering system set forth in claim 8, further comprising:
   a rack and pinion steering mechanism; and
   a steering shaft connected to a steering wheel at one end and the rack and pinion steering mechanism at an opposite end, wherein the steering assist unit is adapted to apply a rotational torque upon the steering shaft.

14. The electric power steering system set forth in claim 13, wherein the steering assist unit includes a worm shaft, an electric motor adapted to drive the worm shaft, and a worm gear interposed between the worm shaft and the steering shaft.

* * * * *